United States Patent
Fiedrich

Patent Number: 5,119,988
Date of Patent: Jun. 9, 1992

[54] HYDRONIC HEATING WATER TEMPERATURE CONTROL SYSTEM

[76] Inventor: Joachim Fiedrich, 20 Red Pine Dr., Carlisle, Mass. 01741

[21] Appl. No.: 545,399

[22] Filed: Jun. 28, 1990

[51] Int. Cl.$^5$ .............................. F24D 3/00
[52] U.S. Cl. ........................ 237/8 C; 237/59
[58] Field of Search ............ 237/8 R, 8 C, 59, 8 B; 236/91 F, 9 A

[56] References Cited

U.S. PATENT DOCUMENTS

| | | | |
|---|---|---|---|
| 2,661,906 | 12/1953 | Stahlberg | 237/8 C |
| 4,679,729 | 7/1987 | Petitjean et al. | 237/8 R |
| 4,832,259 | 5/1989 | Vandermeyden | 237/8 R |

FOREIGN PATENT DOCUMENTS 1254195  4/1960  France ................ 237/8 C

Primary Examiner—Henry A. Bennet
Attorney, Agent, or Firm—Robert T. Dunn

[57] ABSTRACT

A three-way modulated diverting valve is provided in the return line to the boiler of a hydronic heating system between the heating loop return and the boiler return, the valve having its input from the heating loop return, one output to the boiler return and the second output to the heating loop supply, so that the valve diverts some of the cooler return water to the boiler hot supply water, diluting the supply water to reduce the temperature of supply water that feeds the heating loop; and the valve is modulated by a feedback signal representative of the temperature of the diluted supply water. In a preferred embodiment, the feedback modulation is accomplished using a non-electric thermostatic actuator head that drives the valve stem and is controlled by a capillary temperature sensor, the sensor bulb being immersed in the diluted supply water or clamped to the supply line next to the heating loop supply so that it is at the temperature of the diluted supply water. In operation, capillary fluid in the bulb expands with temperature applying a pressure force through the capillary to the actuator head which drives the valve stem, and so the diverting valve is modulated to increase or decrease the flow of return water to dilute the supply water as necessary to maintain the diluted supply water temperature at a predetermined value.

17 Claims, 6 Drawing Sheets

HYDRONIC HEATING WATER TEMPERATURE CONTROL SYSTEM

BACKGROUND OF THE INVENTION

This invention relates to hydronic heating systems for dwellings, offices, etc. and more particularly to methods and means of maintaining the system boiler supply water temperature within a predetermined range.

Hydronic heating systems for heating the rooms in a dwelling, office, etc, are used widely in Europe and to a lesser extent in the United States. Water heated in a boiler is distributed to heating loops of tubing in the dwelling that carry the heat by radiation, conduction and convection to the rooms in the dwelling. A common technique provides a boiler hot water supply feeding the supply header of the heating loops and the boiler water return to which the return header of the heating loops connects. The return water is heated in the boiler and sent out again as hot supply water, and so the water is cycled through the essentially closed system. One or more water pumps in this system keep the water flowing and valves control water flow rates through the loops depending on demand.

A heating loop may include several heating elements like wall mounted radiators and/or baseboard finned tubing that are the principal heat exchangers of the loop, or the tubing itself may be the principal heat exchanger of the loop. In the latter case the tubing is usually buried in the floor of a room and the tubing heats the floor. Often the tubing is buried in a special concrete and so heat exchange is principally by conduction and radiation to the concrete, which in turn heats the room by some conduction and convection, but principally by radiation. Hence, this type of heating is called Radiant Floor Heating (RFH).

In such RFH systems and other hydronic heating systems using wall radiators and/or baseboard finned tubing elements, the supply water temperature from the boiler must be controlled so that it does not exceed certain limits that are substantially lower than the usual boiler supply water temperature. There are several reasons for this: first, the temperature of radiator elements on the wall must not be so high that they are not safe to touch; second, for RFH the floor temperature must not be uncomfortable hot; and third, where the tubing is plastic, the water temperature for some plastic materials must not exceed about 140° F. Good quality "cross-linked" polyethylene tubing, on the other hand, can carry water at temperature in excess of 140° F. without any deterioration of the tubing or the tubing oxygen barrier.

In hydronic heating systems subject to such water temperature limitations, where the boiler is powered by burning fossil fuels, the boiler water supply temperature is usually well above 140° F. and often at about 190° F. to 200° F., and so the boiler supply temperature must be stepped down before it is fed to the heating loops. In the past, an electrically controlled motorized mixing valve has been used in the boiler supply line that feeds the supply header for the heating loops, between the boiler supply and the heating loops supply header. This mixing valve has two inputs and one output. One input is directly from the boiler hot water supply, the other input is from the return header of the heating loops and the output is directly to the supply header of the heating loops. The mixing valve motor is electrically energized by remote reset controls that sometimes respond to outside ambient temperature, inside room temperature, boiler water temperature, supply header water temperature, etc. In operation, the mixing valve mixes some return water with the hot supply water to reduce the temperature of the supply water that is fed to the supply header of the heating loops. Such prior systems perform quite satisfactorily, but they are relatively expensive, require remote transducers and electric power to the valve's motor and relatively greater skill to install and adjust for efficient operation.

In an effort to reduce expense, non-motorized mixing valves have been used in the boiler supply line. These have the disadvantage of providing less comfort and lower long term fuel economy. However, for the small installation (kitchen-bath addition, etc. to a dwelling), where it is difficult to justify the cost of a more sophisticated motorized valve and its controls, these systems are sometimes used. They usually have a remote electrically operated room thermostat controlling a circulator wired through a surface aquastat to prevent overheated water from entering the heating loops; and on the boiler supply line is a dial thermometer that indicates the supply water temperature into the loop supply header. However, manually setting the water temperature into the heating loops by adjusting the valve setting is not precise. Often within a few hours after startup, when temperatures throughout the system have stabilized, fluctuations of the boiler supply water temperature, or varying load conditions at other parts of the system will cause excessive fluctuations of water temperature delivered by the valve to the heating loops supply header. These systems have no feedback control to the mixing valve that is derived from the heating loop supply header water temperature.

SUMMARY OF THE INVENTION

It is an object of all inventions herein to provide a method and means of controlling boiler supply water temperature in a hydronic heating system.

It is another object to provide a hydronic heating system that is relatively less expensive than prior systems of equivalent capacity and which avoids some if the limitations and disadvantages of the prior systems.

It is another object to provide a hydronic heating system with boiler supply water temperature control that is satisfactory to avoid feeding excessively high temperature boiler supply water to the system heating loops.

It is another object to provide a hydronic heating system with boiler supply water temperature control that is satisfactory to avoid feeding excessively high temperature boiler supply water to the system heating loop plastic tubing.

It is another object to provide a hydronic heating system with boiler supply water temperature control that is satisfactory to avoid feeding excessively high temperature boiler supply water to the system heating loop cross-linked polyethylene plastic tubing.

It is another object to provide a hydronic heating system with boiler supply water temperature control that is satisfactory to avoid feeding excessively high temperature boiler supply water to the system FRH loops.

It is another object to provide a hydronic heating system with boiler supply water temperature control that is satisfactory to avoid feeding excessively high temperature boiler supply water to the system radiators.

It is another object to provide a hydronic heating system with boiler supply water temperature control that is satisfactory to avoid feeding excessively high temperature boiler supply water to the system finned tubing heating elements.

It is a particular object of the first invention herein to provide a hydronic heating system with boiler supply water temperature control accomplished by feeding return water into the boiler supply line to reduce the boiler supply water temperature using a control valve in the boiler return line.

It is a particular object of the second invention herein to provide a hydronic heating system with boiler supply water temperature control accomplished by feeding return water into the boiler supply line to reduce the boiler supply water temperature using a relatively simple non-motorized mixing valve in the boiler supply line with non-electric thermostatic controls.

The first invention described herein is called: "Diverting Valve In Return Line With Diluted Supply Water Temperature Feedback Control". According to this first invention, a three-way modulated diverting or by-pass valve is provided in the return line to the boiler between the heating loop return header and the boiler return. The diverting valve has one input and two outputs. The input is from the heating loops return header; the first output is to the boiler return line; and the second output is to the boiler supply line. The diverting valve diverts some of the cooler return water to the hot supply water to reduce the temperature of the supply water feeding the heating loop supply header. Thus, the supply water is diluted with return water, lowering the temperature of the supply water directly from the boiler. The diverting valve is a modulated valve and the temperature of the supply water flowing to the supply header may be detected and used as a feedback control signal to modulate the valve.

In a preferred embodiment the system water pump is in the return line between the return header and the diverting valve input and so that input is at the high pressure side of the pump.

This use of a diverting valve in the return line with the feedback control affords a technique of "Set Point Control". The three-way diverting valve in the return line with its control including temperature feedback from the heating loops supply header provides automatic water tempering, insuring constant supply water temperature to the heating loops. It may be relatively inexpensive and reliable and can be the primary entry-level controller in a hydronic heating system in a dwelling, office, etc.. High quality three-way modulated diverting valves are available from a number of sources.

The feedback control (set point control) of the diverting valve can be provided by remote electric transducers and a motor driving (modulating) the diverting valve. Feedback control can also be provided by a non-electric thermostatic actuator head to the diverting valve stem, controlled by a capillary temperature sensor. In both cases, the feedback control derived from the temperature of the diluted (tempered) supply water that is fed to the heating loops header is the primary valve modulation control.

Where the non-electric thermostatic actuator is used, the feedback control is entirely mechanical and thermostatic. The bulb of the capillary sensor can be inserted directly into the diluted supply water line or into the heating loops supply header, or it may be clamped to the supply line next to the supply header in intimate thermal contact therewith so that it is at the temperature of the diluted supply water flowing into the supply header. In operation, capillary fluid in the bulb expands with temperature applying a pressure force through the capillary to the actuator head and so the diverting valve is modulated to increase or decrease the flow of return water to the supply header as necessary to maintain the water temperature at a predetermined value. That predetermined value can be set by a mechanical bias setting on the actuator. This set point control configuration insures that an accurate reading of the supply header water temperature is made continuously and simultaneously any deviation from the setting is immediately nulled by modulating the valve.

This use of a non-electric modulated setpoint valve operates rapidly and accurately and is an appropriate choice for a small installation or a zone addition to an existing system.

The second invention described herein is called: "Mixing Valve In Supply Line With Non-Electric Mixed Supply Water Temperature Feedback Control". According to this second invention, a three-way modulated mixing valve is provided at the input to the heating loops supply header, with supply water temperature feedback control modulating the valve. Instead of controlling this mixing valve with an electric motor and a remotely wired set point controller, as done on the past, the mixing valve is controlled and modulated by a non-electric thermostatic actuator head attached to the mixing valve stem and controlled by a capillary temperature sensor. Thus, the mixing valve is modulated by non-electric feedback of the diluted supply water temperature. Here, as in an embodiment of the first invention described above, the bulb of the capillary sensor may be inserted into the diluted supply water or it may be clamped to the supply line next to the supply header so that it is at the temperature of water in the supply header. Capillary fluid in the bulb expands with temperature applying a pressure force through the capillary to the actuator head and so the valve is modulated to increase or decrease the flow of return water through the mixing valve as necessary to maintain the temperature of the supply water to the supply header at or below a predetermined value. That value can be set by a mechanical setting on the actuator head. This set point control configuration insures that an accurate reading of the supply header water temperature is made continuously and simultaneously any deviation from the setting is immediately nulled by modulating the mixing valve.

DESCRIPTIONS OF EMBODIMENTS OF THE INVENTIONS

The present inventions provide means for limiting the temperature of the supply water of a hydronic heating system where the water is heated in a boiler powered by burning a fuel.

The reasons for limiting the temperature are several and depend upon the kind of tubing and/or heat exchanger elements that are used in the system heating loops. As mentioned above, some elements are exposed to the occupants of the dwelling and so they must not be so hot that they are not safe to touch. Where RFH is used, the floor temperature must not be uncomfortable hot and where plastic tubing is used the water temperature must be limited so as not to cause early failure of the tubing. Hence, the temperature of the supply water fed to the heating loops is controlled in view of the kind of materials used and in view of the kind of elements used in the heating loops. In a given installation, there may be more than one different kind of element and more than one different kind of material used in the heating loops, all fed from the same boiler. For this reason the improvements enable ready, reliable, in situs adjustment to insure that supply water temperature does not exceed the limitations of the elements and/or materials of each of the heating loops of the system.

Figure 1:
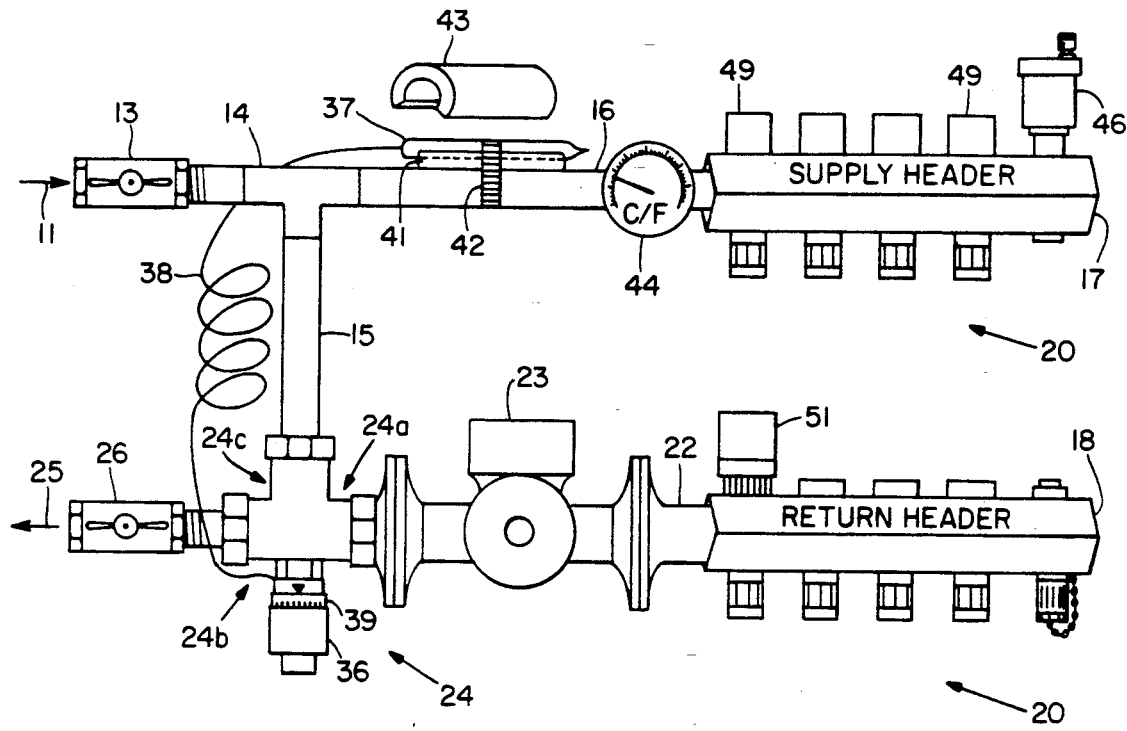
FIG. 1 is a front or elevation view of the piping configuration of the distribution station of a hydronic heating system according to the first invention.
Figure 2:
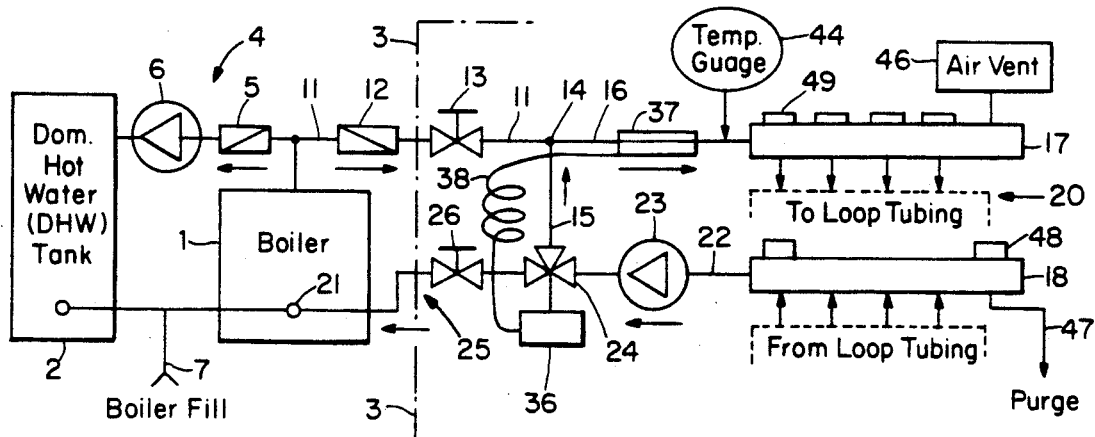
FIG. 2 is a schematic diagram of a hydronic heating system including the distribution station configuration of FIG. 1 with a single set of heating loop headers.

Diverting Valve In Return Line With Diluted Supply Water Temperature Feedback Control Turning first to FIGS. 1 and 2, FIG. 2 is a schematic diagram of a typical hydronic heating system installed in a dwelling incorporating the first of the present inventions and FIG. 1 is a detailed elevation view of the distribution station of the hydronic system. The system includes a boiler 1 that supplies the hydronic distribution station 3 and also supplies the dwelling domestic hot water (DHW) tank 2. The usual requirement of the system is to provide DHW water at about 190° F. to 200° F., which is the usual hot water temperature requirement for washing machines and dish washers. The same boiler supply also feeds the hydronic heating system 3. As shown in FIGS. 1 and 2, the hydronic heating system distribution station 3 includes four heating loops 20, of which one or more require that the supply water temperature be substantially lower than 180° F. and so for those loops, return water is diverted to the loop supply, diluting the loop supply and so reducing the temperature (tempering) the loop supply water to within the required limits.

Figure 3:
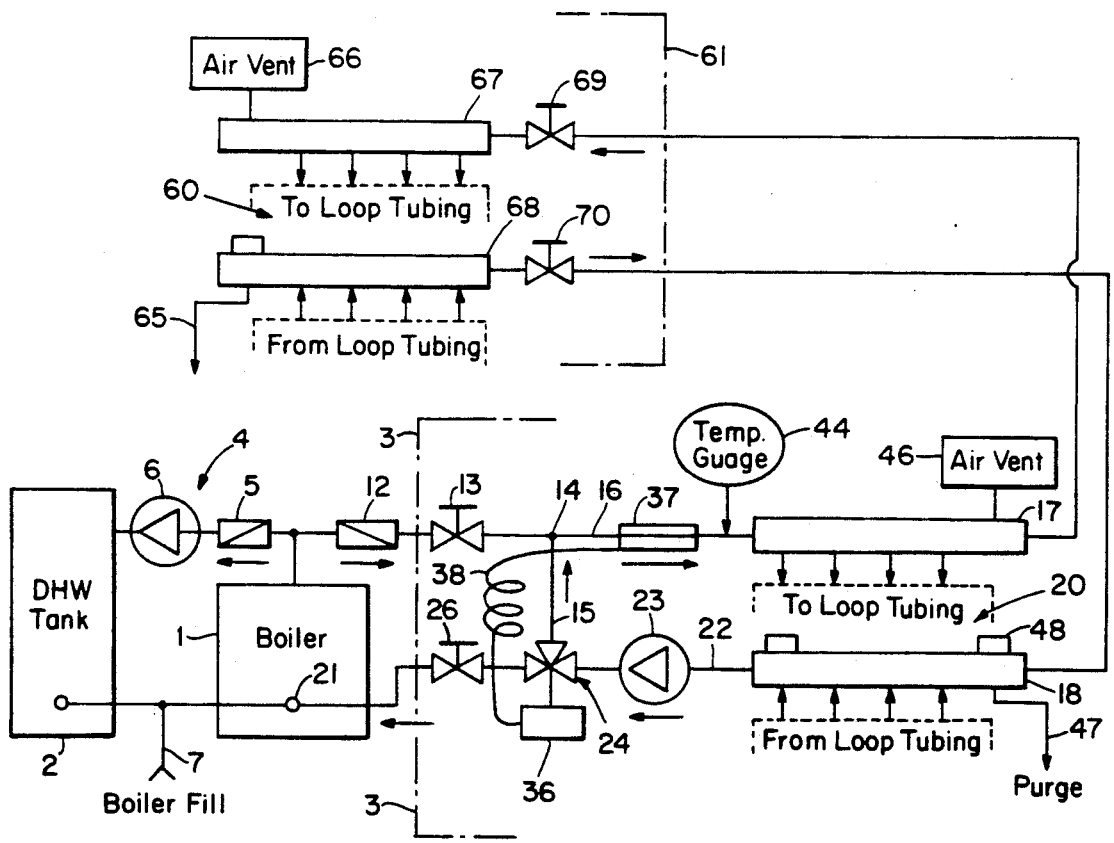
FIG. 3 is a schematic diagram of a hydronic heating system including the distribution station configuration of FIG. 1 with two sets of heating loop headers in series.
Figure 4:
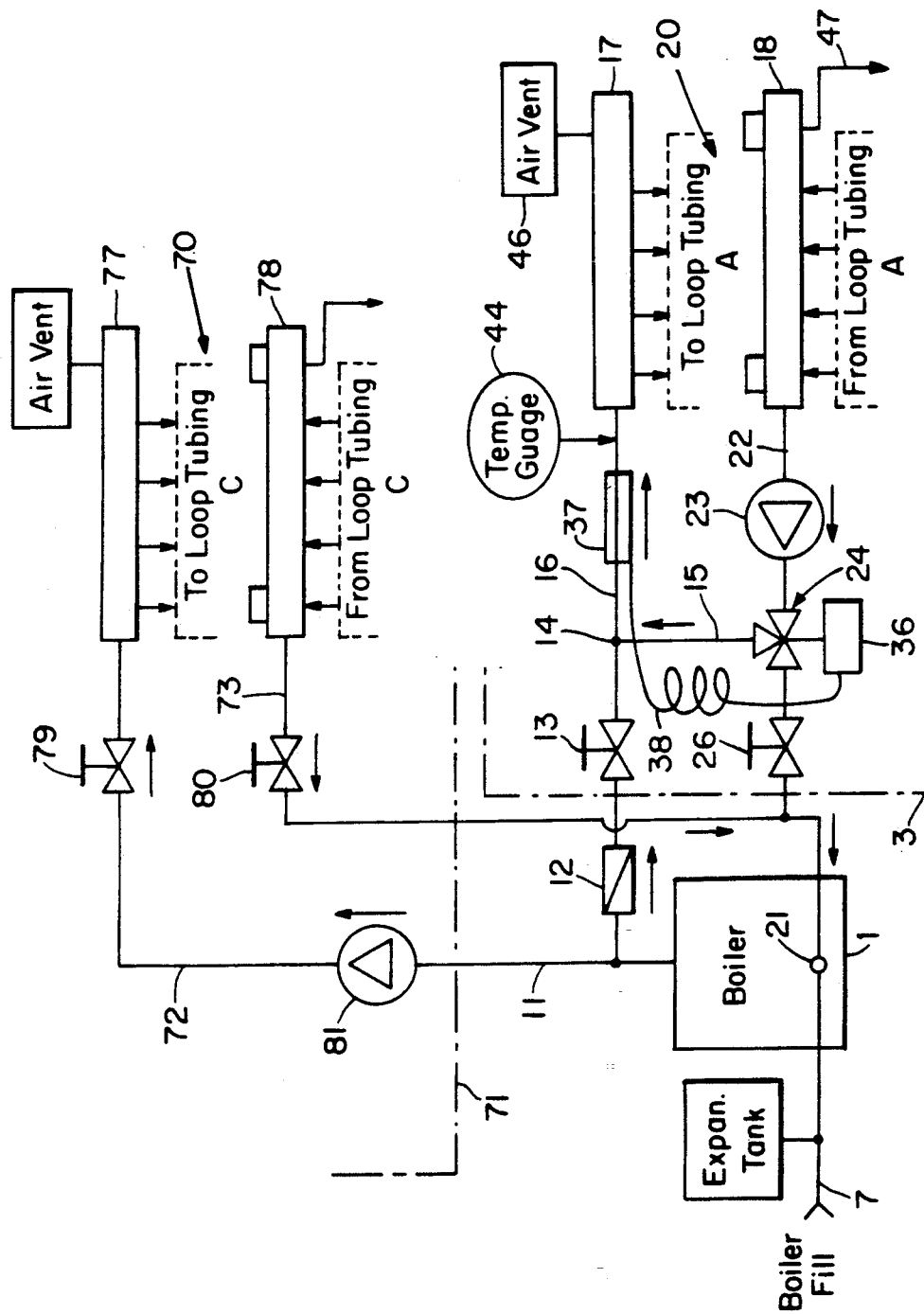
FIG. 4 is a schematic diagram of a hydronic heating system including the distribution station configuration of FIG. 1 with two sets of heating loop headers in parallel.
Figure 5:
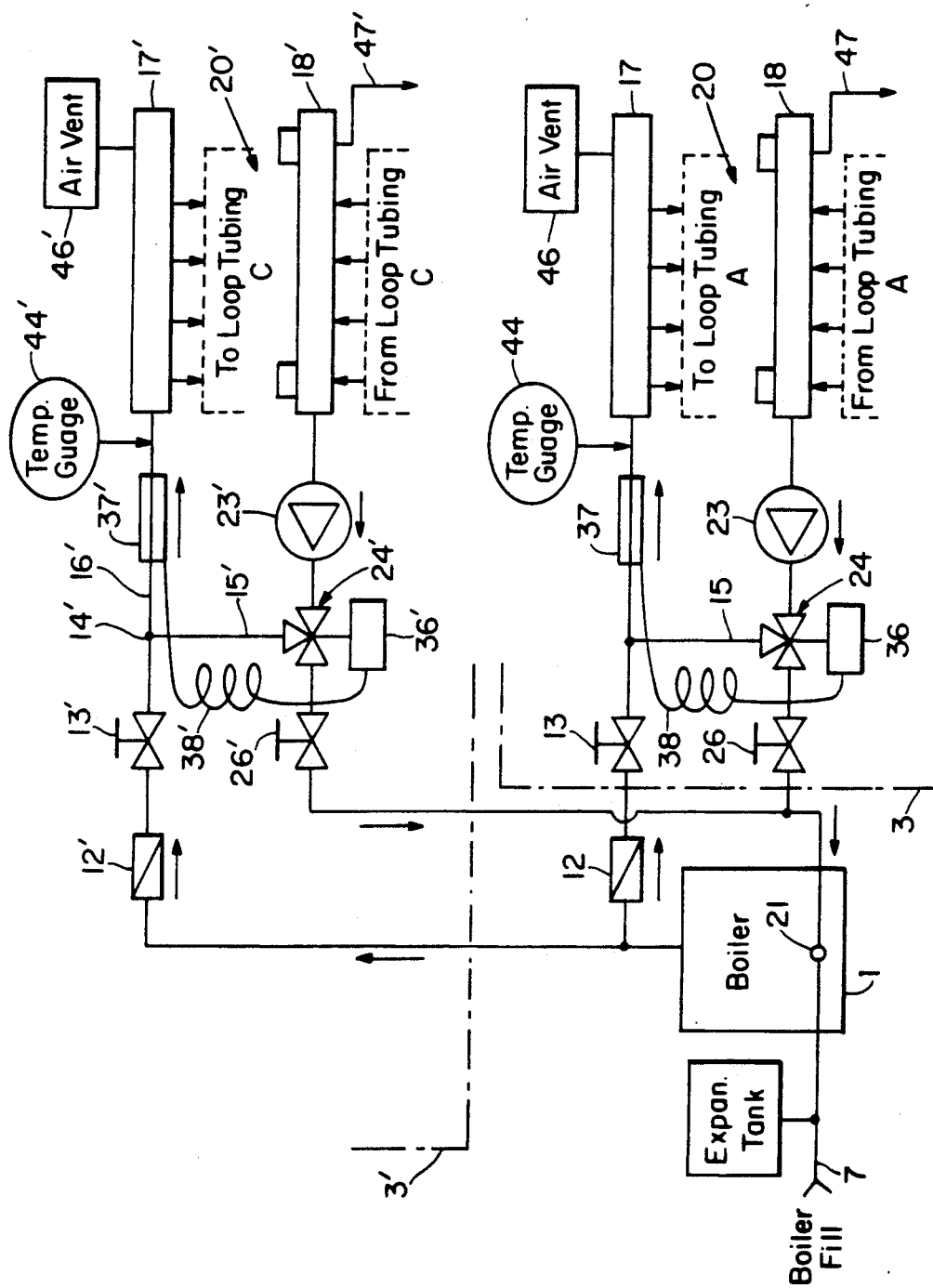
FIG. 5 is a schematic diagram of a hydronic heating system including two independently operating distribution station configuration, like FIG. 1, fed by the boiler.

Other system configurations of heating loops for which return water is diverted to the supply are shown in FIGS. 3 and 5. On the other hand, where the hydronic heating system includes some loops that preferably operate at high supply water temperature (180° F.) and some that must operate at lower temperature, supply water to the low temperature loops is controlled by diverting the cooler return water to the supply to dilute the supply, while the high temperature loops receive undiluted supply water directly from the boiler. Such a combination system is illustrated in FIG. 4.

Turning again to FIGS. 1 and 2, FIG. 1 shows details of the distribution station 3 incorporating a three-way modulated diverting valve in the return line. The boiler supply line 11 to the station includes a unidirectional check valve 12, an isolation ball valve 13, a T connection 14 to diverting line 15 and the continuation 16 of supply line 11 to heating loop supply header 17 that feeds the several (four) heating loops 20. A separate loop tubing connection to the supply header 17 is provided for each loop. At the other end of each loop a similar tubing connection is provided to the return header 18. The return line from header 18 to the boiler return reservoir 21 includes a first section 22 to water pump 23, three-way modulated diverting valve 24, boiler return line 25 and isolation ball valve 26 in the return line.

Figure 6:
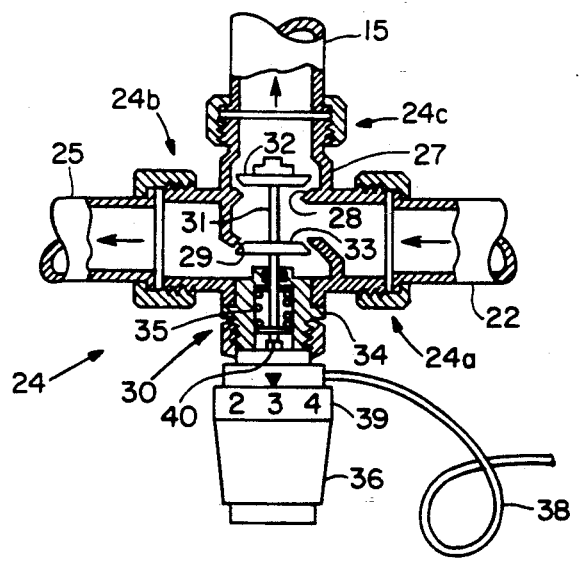
FIG. 6 is a cross section view of a typical modulated diverting valve with thermostatic actuator head attached.

Three-way modulated diverting valve 24 has one water flow input 24a from pump 23, receiving return water from the heating loops, a first water flow output 24b to the boiler return line 25 and a second water flow output 24c to diverting line 15 that connects to the supply line T connection 14. A suitable structure of diverting valve 24 is shown in FIG. 6. The valve includes a housing 27 defining the input and two outputs, a diverting flow seat 28 and a return flow seat 29. The valve spindle assembly 30 includes the stem 31, carrying the diverting flow disc 32 and the return flow disc 33 adapted to close against the seats 28 and 29, respectively. The stem is carried by the stem gland assembly 34 that fits tightly to the housing and is sealed thereto, the stem being slideably carried by the gland assembly and the stem is spring loaded by coil spring 35 which urges the stem to move in a direction that closes the diverting water passage 24c and opens the return water passage 24b.

Modulation of valve 24 is accomplished by moving the stem 31 against spring 35 and is done by delivering a force to the stem to overcome the spring resistance. A structure for delivering this modulating force to the valve stem is also shown in FIGS. 1 and 6. It is a non-electric, thermostatic, automatic controller for the valve including an actuating controller head 36, a thermal sensor bulb 37 and a capillary line 38 from the sensor bulb to the head. The sensor bulb and capillary contain a fluid that expands as the fluid temperature increases, delivering an increased pressure force via the capillary to the head, which converts the fluid pressure to a mechanical force against the stem at point 40. Thus, when the temperature of the fluid in the sensor bulb increases, the force on the stem increases, increasing the diverted water flow. In this way, the temperature of the diluted supply water flowing to the loops supply header 17 is effective as a feedback control signal to modulate the valve.

Sensor bulb 37 is preferably located so as to detect the temperature of the supply water flow into header 17 that feeds the heating loops. This can be done using a structure (not shown) for inserting the bulb into the supply water line 16 or inserting the bulb into the supply header 17. It can also be done more simply by attaching the sensor bulb in intimate thermal contact with the outside of supply line 16 as shown in FIG. 1. For this purpose, the elongated sensor bulb 37 is oriented longitudinally along line 16, partially enclosed by mounting block 41 that also partially encloses line 16 and is secured tightly thereto by strap 42. Block is made of highly thermally conductive material such as copper or aluminum, to insure that the temperature of the fluid in the bulb is substantially the same as the temperature of the tempered supply water flowing in line 16 immediately adjacent thereto. Also, this assembly may be covered with an insulating sleeve 43 to insure the equality of temperature. A visible temperature gauge 44 is also attached to line 16 close to header 17 in intimate thermal contact with the line so that it displays a temperature as near to the temperature of the tempered supply water as possible.

A suitable three-way diverting valve for use in this system is manufactured by F. W. Overtrop KG, of Olsberg, West Germany and is designated three-way valve PN10. A suitable valve-control head, sensor bulb and capillary for controlling such a three-way diverting valve is also manufactured by Overtrop and called a temperature controller.

An initial adjustment of the system when operation first commences can be carried out as follows: (a) with supply water flowing to one or more of the heating loops, observe the temperature indication of temperature gauge 44; (b) if the temperature indicated by gauge 44 is too high, rotate manual adjusting ring 39 of controller head 36, decreasing the index number in line with the marker thereon, thereby increasing the force that the head exerts on the valve stem spring for the then prevailing bulb fluid pressure and so diverted return water flow via line 15 to supply line 16 is increased reducing the temperature of the water in the header; (c) on the other hand, if the temperature gauge 44 reads too low, rotate ring 39 to increase the indicated number and so less return water is diverted to the supply line and the temperature of the supply water flow to header 17 increases. These adjustments are made until the system operates steadily at the supply water temperature desired as indicated by temperature water gauge 44. At that point, the system is, in effect, calibrated for automatic feedback operation to deliver tempered (diluted) supply water to header 17 at the desired temperature even though various heating loops are turned on and off, depending upon demand, and the boiler supply water temperature fluctuates up and down, again, depending upon demand.

For added safety and ease of maintenance, the supply header 17 may be equipped with an air vent 46 and the return header may be equipped with a purge line 47 controlled by a manually operated valve 48. Supply water flow to each of heating loops may be controlled by a balancing valve with an internal position set screw. Such balancing valves for each loop are denoted 49. An alternate control for each loop could be an electrically operated power head like 51, each controlled by an electrical thermostat in the dwelling.

FIG. 3 shows the same system as FIG. 2 with an additional distribution station 61 in series with distribution station 3, providing supply and return headers for additional heating loops 60 and includes supply and return headers 67 and 68 that each may be equipped the same as headers 17 and 18, respectively. In operation the supply water at controlled temperature is fed to both of the supply headers 17 and 67, first into header 17 and then through isolation valve 69 into header 67 and so heating loops 20 and heating loops 60 are fed tempered supply water from the same control. Similarly, return water from heating loops 60 flows through valve 70 to return header 18 where it is combined with return water from loops 20 and on through pump 23 and diverting valve 24 to boiler return 21. This system is suitable where all of the heating loops 20 and 60 require supply water at the same temperature.

The system in FIG. 4 also includes two distribution stations. Station 3 is the same as Station 3 in FIGS. 2 and 3 and supply water is tempered so that it does not exceed predetermined limits. The other station 71 does not include any tempering of supply water, but receives supply water directly from the boiler supply line 11 via pump 81 and supply line 72 of station 71. A supply line isolation valve 79 is provided in the line into supply header 77 and a return line isolation valve 80 is provided in the return line 73 from return header 78. The heating loops 70 extend between supply and return headers 77 and 78. The two distribution systems 3 and 71 receive boiler supply water at the temperature required for station 71 and the heating loops on that station are designed for operation at that temperature which may be 180° F. to 200° F. However, the distribution station 3, heating loops 20 require lower supply water temperature and so are equipped with the system that diverts return water into the supply header to maintain the lower supply water temperature. This system may or may not feed a DHW tank and so the boiler high temperature may be limited by the limitations of heating loops 70.

FIG. 5 illustrates a system having two distribution stations each of which requires supply water temperature control, and the supply water temperature required for each station is different. Hence, in this system, the first distribution station 3 and the second distribution station 3' are essentially connected in parallel with the boiler supply and return and they are substantially identically equipped, although they are operated at different temperatures. Since the equipment at each of these stations is the same, they bear the same reference numbers, but in station 3' the reference numbers all include a prime. Here again, the boiler may or may not supply hot water to other systems in the premises.

Figure 7:
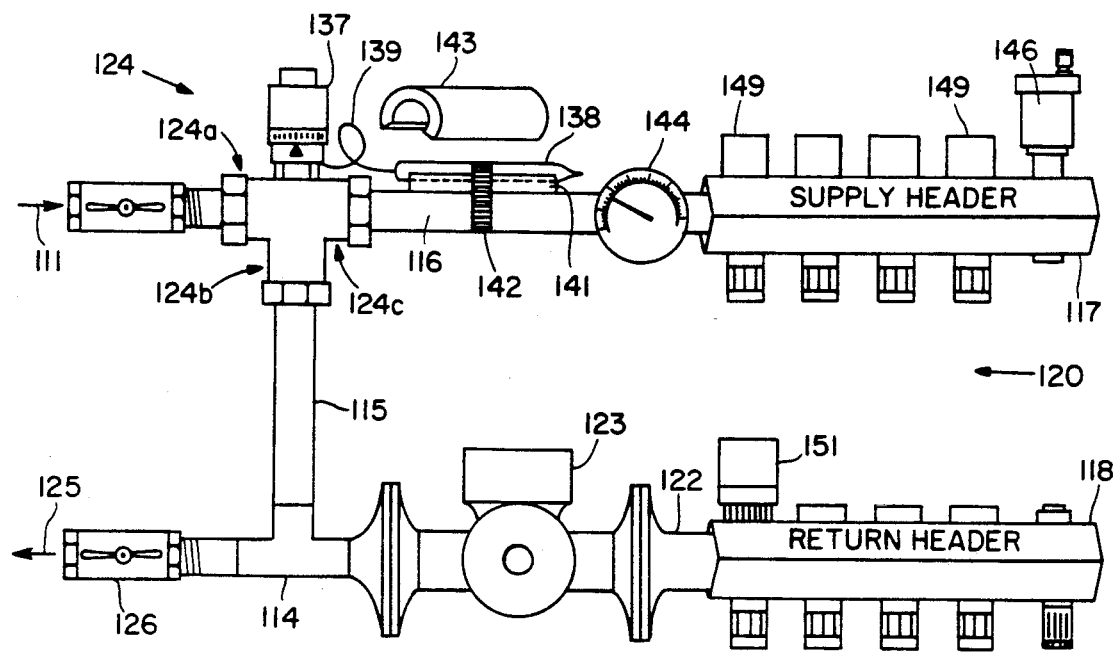
FIG. 7 is a front or elevation view of the piping configuration of the distribution station of a hydronic heating system according to the second invention.
Figure 8:
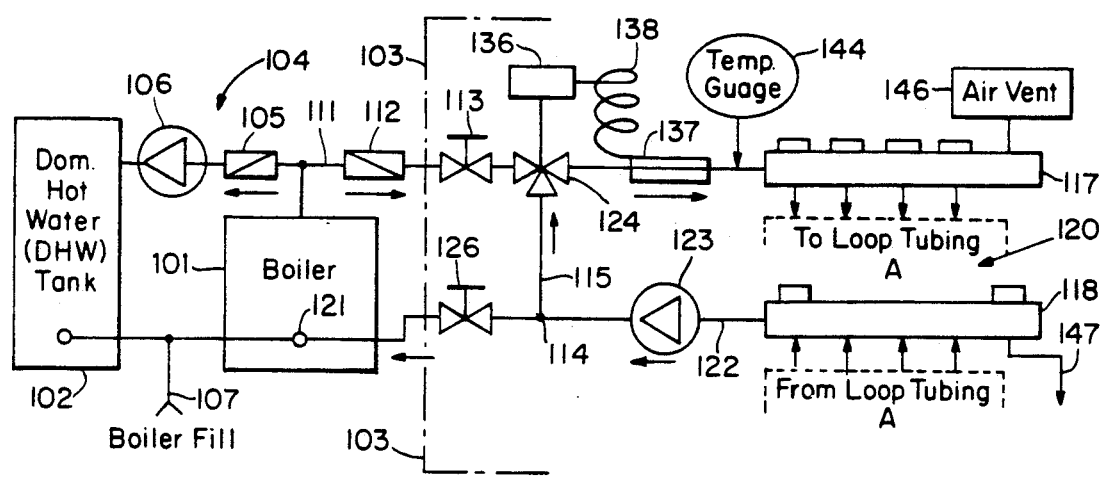
FIG. 8 is a schematic diagram of a hydronic heating system including the distribution station configuration of FIG. 7 with a single set of heating loop headers.

Mixing Valve In Supply Line With Non-Electric Mixed Supply Water Temperature Feedback Control Turning to FIGS. 7 and 8, FIG. 8 is a schematic diagram of a typical hydronic heating system installed in a dwelling incorporating the second of the present inventions and FIG. 7 is a detailed elevation view of the distribution station of the hydronic system. The boiler 101 supplies the system distribution station 103 and the domestic hot water (DHW) tank 102. Here, as in the first invention, the boiler provides DHW water at about 190° F., as required for washing machines and dish washers and the boiler supply also feeds the hydronic heating system. As shown, the hydronic heating system includes four heating loops 120 between supply header 117 and return header 118, of which one or more require that the supply water temperature be substantially lower than 190° F. and so for those loops, return water is diverted to the loop supply, tempering the loop supply and so reducing the temperature of the loop supply water to within the required limits.

FIG. 7 shows details of the distribution station 103 incorporating a three-way modulated mixing valve in the boiler supply line 111. The boiler supply line also includes a unidirectional check valve 112, isolation ball valve 113 and the continuation 116 of supply line 111 to heating loop supply header 117 that feeds the several (four) heating loops 120, a separate loop tubing connection to the supply header being provided for each loop. At the other end of each loop a similar tubing connection is provided to the return header 118.

The return line from header 118 to the boiler return reservoir 121 includes a first section 122 to water pump 123, a T connector 114 to the three-way modulated mixing valve 124, boiler return line 125 and isolation ball valve 126 in the return line.

Figure 9:
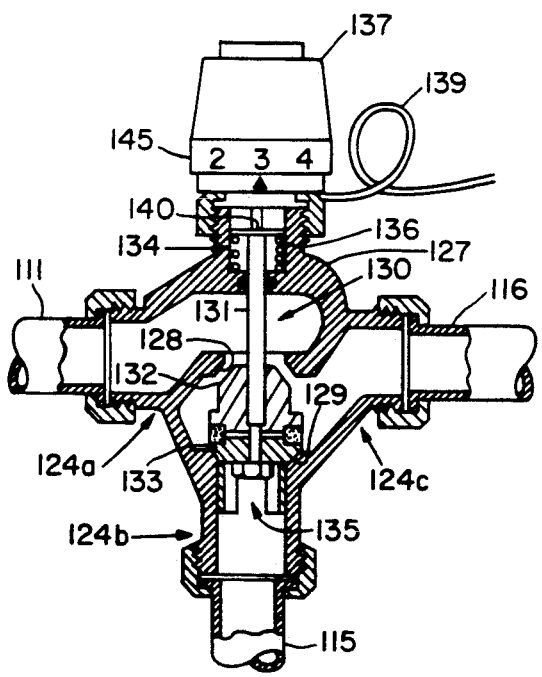
FIG. 9 is a cross section view of a typical modulated mixing valve with thermostatic actuator head attached.

Three-way mixing valve 124 has a first water flow input 124a from supply line 111, a second water flow input 124b from shunt line 115 that feeds return water to the valve from the T connector 114 and one output to the supply header 117. A suitable structure of mixing valve 124 is shown in FIG. 9. The valve includes a housing 127 defining the two inputs and the output, a supply water flow seat 128 and a return water flow seat 129. The valve spindle assembly 130 includes the stem 131, carrying the supply flow plug 132 and the return flow plug 133 adapted to close against the supply and return flow seats 128 and 129, respectively. The stem is carried by the stem spring guide assembly 134 at one end, and the shunt input guide assembly 135 at the other end, the stem being slideably carried by these assemblies. In spring guide assembly 134, the stem is spring loaded by coil spring 136 which urges the stem to move in a direction that closes the supply water input passage 124a and opens the return water input passage 124b. This action reduces the temperature of the mixed water flowing from the valve output 124c to the heating loops supply header.

Valve 124 is modulated by moving the stem 131 against spring 136 by delivering a force to the stem to overcome the spring resistance. A structure for delivering this modulating force to the valve stem is also shown in FIGS. 7 and 9. It is a non-electric, thermostatic automatic controller for the valve including an actuating controller head 137, a thermal sensor bulb 138 and a capillary line 139 from the sensor bulb to the head. The sensor bulb and capillary contain a fluid that expands as the fluid temperature increases delivering an increased pressure force via the capillary to the head which converts the fluid pressure to a mechanical force against the stem at point 140. Thus, when the temperature of the fluid in the sensor bulb increases, the force on the stem increases, increasing the shunted water flow from the return line that is mixed with supply water flow to the supply header.

Sensor bulb 138 is located on the supply line adjacent supply header 117 to detect the temperature of the water flow into the supply header. For this purpose, the elongated sensor bulb is attached longitudinally along line 116, partially enclosed by mounting block 141 that also partially encloses line 116 and is secured tightly thereto by strap 142. Block is made of highly thermally conductive material such as copper or aluminum and is covered with an insulating sleeve 143 to insure the equality of temperature. A visible temperature gauge 144 is also attached to line 116 close to header 117 in intimate thermal contact with the line so that it displays a temperature as near to the supply water temperature as possible.

A suitable three-way mixing valve for use in this system is manufactured by F. W. Overtrop KG in Olsberg, West Germany and is designated three-way mixing valve. A suitable valve-control head, sensor bulb and capillary for controlling such a three-way diverting valve is also manufactured by Overtrop and called a temperature controller.

An initial adjustment of the system when operation first commences can be carried out as follows: (a) with supply water flowing to one or more of the heating loops, observe the temperature indication of temperature gauge 144; b) if the temperature indicated by gauge 144 is too high, rotate manual adjusting ring 145 of controller head 137 decreasing the index number that is in line with the marker thereof, thereby decreasing the force that the head exerts on the dial stem spring for the then prevailing bulb fluid pressure and so return water flow via shunt 115 to supply line 116 is increased, reducing the temperature of the water in the header; (c) on the other hand, if the temperature gauge 144 reads too low, rotate ring 145 to increase the indicated number and less return water is diverted to the supply line and the temperature of the supply water flow to header 117 increases. These adjustments are made until the system operates steadily at the supply water temperature indicated by temperature water gauge 144 that is desired. At that point, the system is, in effect, calibrated for automatic feedback operation to deliver mixed (tempered) supply water to header 117 at the desired temperature even though various heating loops are turned on and off, depending upon demand, and the boiler supply water temperature fluctuates up and down, again depending upon demand.

For added safety and ease of maintenance, the supply header 117 may be equipped with an air vent 146 and the return header may be equipped with a purge line 147 controlled by a manually operated valve 148. Supply water flow to each of heating loops may be controlled by a balancing valve with an internal position set screw. Such balancing valves for each loop are denoted 149. An alternate control for each loop could be an electrically operated power head like 151 each controlled by an electrical thermostat in the dwelling.

Conclusion

While the inventions are described herein in connection with several preferred embodiments, it will be understood that it is not intended to limit the inventions to those embodiments. It is intended to cover all alternatives, modifications, equivalents and variations of those embodiments and their features as may be made by those skilled in the art within the spirit and scope of the invention as defined by the appended claims.

I claim:

1. In a hydronic heating system having a source of hot supply water and a reservoir of cooler return water, a supply water line from said source, a return water line to said reservoir and at least one heating loop through which water flows from said supply line to said return line, the improvement comprising:
    (a) means for diverting water flow from said return line to said supply line including a valve having a water flow input, first and second water flow outputs and means for modulating the output water flow thereof between said first and second water flow outputs,
    (b) whereby said supply water to said heating loop is diluted with said diverted return water, reducing the temperature thereof, and
    (c) means responsive to the temperature of said diluted supply water for controlling said valve modulating means.

2. A hydronic heating system as in claim 1 wherein:

(a) said valve water flow input is from said return water line,
(b) said valve first water flow output is to said reservoir, and
(c) said valve second water flow output is to said supply water line.

3. A hydronic heating system as in claim 2 wherein:
(a) said source is a combustion boiler supply,
(b) said reservoir is said boiler water reserve,
(c) said system has a first water flow path from said boiler supply through said supply water line, through said heating loop, through said return water line and said valve to said boiler reservoir, and
(d) means are provided in said system for compelling water to flow through said first water flow path.

4. A hydronic heating system as in claim 3 wherein:
(a) said means for compelling water to flow is a water pump, and
(b) said water pump is in said first water flow path between said heating loop and said boiler reservoir.

5. A hydronic heating system as in claim 4 wherein:
(a) said water pump is in said first water flow path between said heating loop and said valve.

6. A hydronic heating system as in claim 1 wherein:
(a) said means responsive to the temperature of said diluted supply water for controlling said valve modulating means is a thermostatic controller having a capillary temperature sensor and a thermostatic actuator,
(b) said capillary temperature sensor is attached to said supply water line that carries diluted supply water, and
(c) said thermostatic actuator controls said valve modulating means.

7. A hydronic heating system as in claim 3 wherein:
(a) said means responsive to the temperature of said diluted supply water for controlling said valve modulating means is a thermostatic controller having a capillary temperature sensor and a thermostatic actuator,
(b) said capillary temperature sensor is attached to said supply water line that carries diluted supply water, and
(c) said thermostatic actuator controls said valve modulating means.

8. A hydronic heating system as in claim 3 wherein:
(a) said system has a second water flow path from said valve second water flow output to said supply line, through said heating loop to said valve water flow input.

9. A hydronic heating system as in claim 8 wherein:
(a) said means for compelling water to flow is a water pump, and
(b) said water pump is in said second water flow path between said heating loop and said valve water flow input.

10. In a hydronic heating system having a hot water supply from a fuel fired boiler, a water supply line and a return line to said boiler and at least one heating loop through which hot water from said supply line is fed, gives up heat to heating elements in said heating loop and is returned to said boiler via said water return line, the improvement comprising:
(a) a modulated diverting valve in said water return line for diverting return water to said supply water line said diverting valve including a water flow input, first and second water flow outputs and means for modulating the output water flow thereof between said first and second water flow outputs,
(b) whereby said supply water flow to said heating loop is diluted with return water flow from said loop, and
(c) means responsive to the temperature of said diluted water flow to said loop controlling modulation of said modulating means.

11. A hydronic heating system as in claim 10 wherein:
(a) said modulated diverting valve water flow input is from said water return line, and
(b) one of said valve water flow outputs is to said supply water line.

12. A hydronic heating system as in claim 10 wherein:
(a) said system has a first water flow path from said boiler supply through said supply line, through said heating loop, through said return line and said valve to said boiler reservoir, and
(b) means are provided in said system for compelling water to flow through said first water flow path.

13. A hydronic heating system as in claim 12 wherein:
(a) said means for compelling water to flow is a water pump, and
(b) said water pump is in said first water flow path between said heating loop and said boiler reservoir.

14. A hydronic heating system as in claim 13 wherein:
(a) said water pump is in said first water flow path between said heating loop and said valve.

15. A hydronic heating system as in claim 11 wherein:
(a) said means responsive to the temperature of said diluted supply water for controlling said valve modulating means is a thermostatic actuator having a capillary temperature sensor and a thermostatic actuator,
(b) said capillary temperature sensor is attached to said supply water line that carries diluted supply water, and
(c) said thermostatic actuator controls said modulating means.

16. A hydronic heating system as in claim 13 wherein:
(a) said means responsive to the temperature of said diluted supply water for controlling said valve modulating means is a thermostatic actuator having a capillary temperature sensor and a thermostatic actuator,
(b) said capillary temperature sensor is attached to said supply water line that carries diluted supply water, and
(c) said thermostatic actuator controls said valve modulating means.

17. A hydronic heating system as in claim 13 wherein:
said system has a second water flow path from said valve second water flow output to said supply line, through said heating loop to said valve water flow input.

* * * * *